(12) United States Patent
Schmitz

(10) Patent No.: US 7,963,179 B2
(45) Date of Patent: Jun. 21, 2011

(54) ARRANGEMENT FOR THE NON-CONTACT MEASUREMENT OF TORQUE

(75) Inventor: Rolf Schmitz, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 151 days.

(21) Appl. No.: 12/465,714

(22) Filed: May 14, 2009

(65) Prior Publication Data

US 2009/0293642 A1   Dec. 3, 2009

(30) Foreign Application Priority Data

May 29, 2008 (DE) .......................... 10 2008 002 065

(51) Int. Cl.
*G01L 3/02* (2006.01)
(52) U.S. Cl. ............................. 73/862.331; 73/862.335
(58) Field of Classification Search .............. 73/862.331–862.335
See application file for complete search history.

(56) References Cited

U.S. PATENT DOCUMENTS

| | | | |
|---|---|---|---|
| 3,224,262 A | | 12/1965 | Shipley |
| 4,034,245 A | * | 7/1977 | Mailfert et al. ................. 310/52 |
| 4,185,504 A | * | 1/1980 | Exner et al. ..................... 73/761 |
| 5,837,909 A | * | 11/1998 | Bill et al. ................. 73/862.338 |
| 6,810,754 B2 | * | 11/2004 | May .......................... 73/862.333 |
| 6,826,969 B1 | * | 12/2004 | May .......................... 73/862.331 |
| 6,912,922 B2 | * | 7/2005 | Cheshmehdoost et al. ....................... 73/862.333 |
| 6,951,145 B2 | * | 10/2005 | Kilmartin ................ 73/862.333 |
| 2002/0059839 A1 | | 5/2002 | Cheshmehdoost et al. |

FOREIGN PATENT DOCUMENTS

| | | |
|---|---|---|
| CH | 405 758 | 7/1966 |
| DE | P15 232 AZ | 9/1881 |
| DE | 24 44 247 A1 | 3/1976 |
| DE | 26 36 086 A1 | 2/1978 |
| DE | 31 04 091 A1 | 10/1982 |
| DE | 31 04 092 A1 | 11/1982 |
| DE | 40 09 286 A1 | 9/1990 |
| DE | 100 23 961 A1 | 1/2002 |
| DE | 201 12 833 U1 | 12/2002 |
| DE | 600 00 351 T2 | 4/2003 |
| DE | 600 07 540 T2 | 11/2004 |
| DE | 601 09 715 T2 | 2/2006 |
| GB | 829 399 | 3/1960 |
| WO | 99/21151 A2 | 4/1999 |

\* cited by examiner

*Primary Examiner* — Max Noori
(74) *Attorney, Agent, or Firm* — Davis & Bujold, P.L.L.C.

(57) ABSTRACT

An arrangement for the non-contact measurement of torque on a shaft of a transmission. The arrangement having at least one detector (1) for detecting a variation in a magnetic field (2) as a function of a torque applied to the shaft. The shaft is a hollow shaft (3) and the detector (1) is arranged inside the hollow shaft (3).

11 Claims, 1 Drawing Sheet

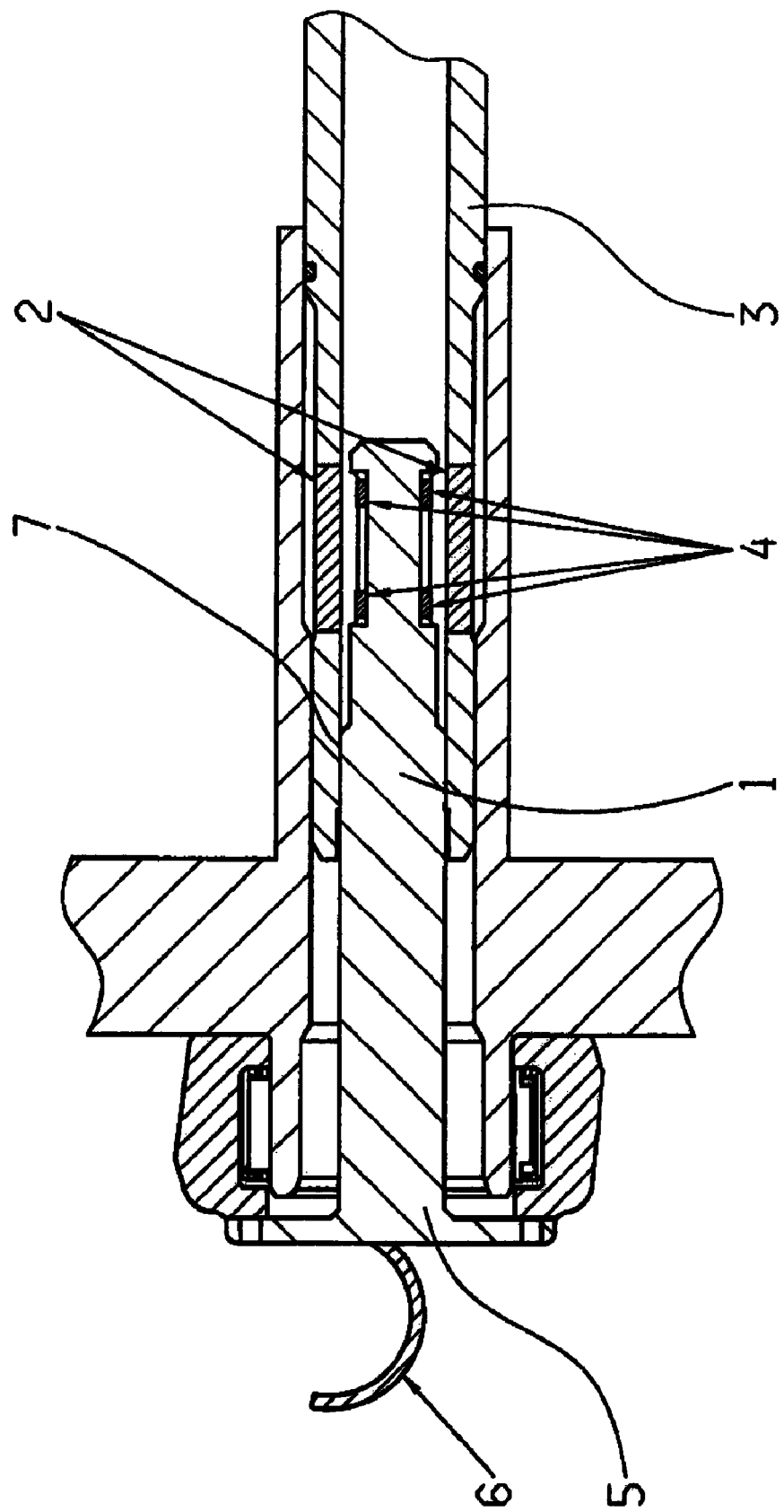

ARRANGEMENT FOR THE NON-CONTACT MEASUREMENT OF TORQUE

This application claims priority from German patent application serial no. 10 2008 002 065.6 filed May 29, 2008.

FIELD OF THE INVENTION

The present invention concerns an arrangement for the non-contact measurement of torque on a shaft of a transmission.

BACKGROUND OF THE INVENTION

From automotive technology it is known that to determine torque on a shaft of a transmission sensors are used which, for example, measure the travel of a clutch provided on the shaft or even the pressure applied on the clutch, in order from this to draw conclusions about the torque applied on the shaft. In such cases the accuracy and the dynamics are not sufficient to use such torque determination for regulating the torque or force transmission in a transmission.

For example, from the document DE 600 07 540 T2 a torque sensor is known. The torque sensor enables contact-free determination of torque on a driveshaft using a method of ambient magnetization. In this, the driveshaft is magnetized axially and the axial magnetization emits a torque-dependent external boundary field which is detected by a sensor. Thus, a torque applied to the driveshaft can be determined by this known torque sensor. However, the torque sensor is arranged radially outside in the circumferential area of the shaft. This disadvantageously demands additional structural space, especially in the radial direction.

SUMMARY OF THE INVENTION

The purpose of the present invention is to propose an arrangement for the non-contact measurement of torque, of the type described at the start, which is optimized particularly in relation to the structural space required and the manufacturing costs.

Accordingly, an arrangement is proposed for the non-contact measurement of torque on a shaft of a transmission, with at least one detector for determining a change in a magnetic field that varies as a function of a torque applied to the shaft, the shaft being made as a hollow shaft and the detector being arranged inside the hollow shaft. In this way the structural space needed for the arrangement according to the invention can be reduced, since the arrangement makes use of the space already present on the inside of the shaft.

The arrangement according to the invention uses the magneto-elastic measurement principle for non-contact torque measurement in which the torsion taking place changes the magnetic field at the shaft and this is detected, the change of magnetic field being proportional to the torque applied. The torque determined in this way enables real-time measurement for the regulation of the transmission clutch. Thus, wear and the variation of the friction values during the life of the clutch can be monitored directly on-line and compensated for, so there is no need for a model calculation. Furthermore, not only can the otherwise necessary path or pressure sensors be omitted, but memory capacity in the electronic control unit can also be saved, since the otherwise necessary software algorithms are not needed. In addition, using the arrangement according to the invention in a transmission system results in greater accuracy and better dynamics. Moreover, considerable costs are saved during development and testing of clutch friction values over the lifetime of the clutch.

In addition, the very space-saving arrangement according to the invention allows optimum integration into an existing transmission system. It is then particularly advantageous for the detector of the arrangement according to the invention to be designed as a support that is inserted in the hollow shaft. The detector can then be attached in fixed position, for example to a housing or suchlike, so as to determine the torque without contact and wear.

Preferably, the support or support housing can be shaped as a rod, with at least one sensor element arranged in a first end area which is inserted inside the hollow shaft. The sensor element provided is positioned adjacent to the magnetic zone or magnetic field of the hollow shaft so as to detect the change in the magnetic zone produced by torsion. This enables direct determination of the magnitudes needed for regulation without having to calculate those magnitudes, for example from extraneous signals. Consequently an efficiency-optimized system is realized, which therefore results in cost savings, less wear, longer life and service according to need.

In a possible design version of the invention it can be provided that the sensor element are coils, Hall elements (Hall effect) and/or magnetic resonance (MR) elements and are used to detect the magnetic field changes. The sensor elements are designed to withstand ambient conditions such as oil, extreme temperatures, vibrations or suchlike. Preferably, suitable protective surroundings can be provided for the sensor elements.

To integrate the arrangement according to the invention integrally into an existing transmission system, according to a further development it can be provided that the second end area of the support comprises a mounting flange. With this mounting flange or even with other possible mounting means the detector can be attached at its end so as to be held with its first end inside the hollow shaft. Preferably, the mounting flange can also include a cable connection so that no additional electrical connection to the electronic control unit is needed. The mounting flange can be formed integrally on the detector or made as a separate component.

To support the detector inside the hollow shaft, according to a possible embodiment variant of the invention it can be provided that the detector is fitted in the hollow shaft with at least one slide bearing. Other bearing options are also conceivable.

The arrangement according to the invention can preferably be used in an all-wheel distributor transmission for regulating the torque transfer at a clutch. Other fields of application are also possible for the arrangement proposed according to the invention. In the preferred application, the transmission output torque can be determined by the arrangement according to the invention and distributed by the all-wheel distributor transmission to the front and rear axles. The torque distribution in the drivetrain can be used for improving the driving dynamics and safety with the help of electronic regulation systems.

BRIEF DESCRIPTION OF THE DRAWING

Below, the present invention is described in more detail with reference to the drawing.

The single FIGURE illustrating the invention shows a schematic sectioned view of a possible embodiment variant of an arrangement according to the invention for the non-contact measurement of torque on a shaft of a distributor transmission.

DETAILED DESCRIPTION OF THE PREFERRED EMBODIMENTS

The arrangement according to the invention comprises a detector 1 for determining variation of a magnetic field 2 as a function of a torque applied to the transmission shaft made as a hollow shaft 3. The magnetic field 2 is provided in approximately annular shape on the inside diameter of the hollow shaft 3 and extends in the axial direction over a predetermined area. Preferably, the magnetic field 2 can be appropriately magnetically coded.

According to the invention, the detector 1 is a rod-shaped support which is arranged inside the hollow shaft 3 and which comprises a housing. On a first end that is inserted into the hollow shaft 3 the detector 1 has a plurality of sensor elements 4, associated with the magnetic field 2 of the hollow shaft 3.

The magnetic field 2 is formed by a magnetized section. As sensor elements 4, for example coils or other elements can be used. In the embodiment variant illustrated the sensor elements 4 are made as two approximately ring-shaped coils that all set a predetermined distance apart from one another. So that, to detect a change in the magnetic field 2, the sensor elements are positioned within the magnetic field 2. In the embodiment variant illustrated, the annular sensor elements 4 are positioned approximately on the outer periphery of the first end of the detector 1.

The second end of the detector 1 is made as a mounting flange 5, so that the detector 1 can be attached fixed on the housing. The mounting flange 5 comprises a cable connection 6 so that the sensor elements 4 can be connected electronically to a control unit (not shown).

To support the detector 1 in the hollow shaft 3, a sliding bearing 7 is shown, by means of which the detector 1 can be mounted optimally within the hollow shaft 3 of the transmission.

INDEXES

1. Detector
2. Magnetic field
3. Hollow shaft
4. Sensor element
5. Mounting flange
6. Cable connection
7. Slide bearing

The invention claimed is:

1. An arrangement for a non-contact measurement of torque on a shaft of a transmission via at least one detector (1) for detecting a change in a magnetic field (2) as a function of the torque applied to the shaft,
   wherein shaft is a hollow shaft (3),
   the detector (1) is a support that is inserted inside the hollow shaft (3),
   the support is approximately rod-shaped, and at least one sensor element (4) is arranged on a first end inserted into the hollow shaft (3), and
   a second end of the support is a mounting flange (5) for securing the detector to the arrangement.

2. The arrangement according to claim 1, wherein each sensor element (4) is associated with the magnetic field (2) of the hollow shaft (3).

3. The arrangement according to claim 1, wherein the sensor element (4) is at least one of a coil, a Hall element and a magnetic resonance element.

4. The arrangement according to claim 1, wherein the mounting flange (5) comprises a cable connection (6).

5. The arrangement according to claim 1, wherein the detector is mounted inside the hollow shaft (3) by at least one slide bearing (7).

6. The arrangement according to claim 1, wherein the arrangement is used in an all-wheel distributor transmission for regulating torque transfer at a clutch.

7. An arrangement for contact free measurement of torque, the arrangement comprising:
   a detector (1) having opposed first and second ends, at least one magnetic field sensor element (4) being fixed the first end of the detector (1) and the second end of the detector (1) having a mounting flange (5) that is fixed to a housing, a cable connection (6) being secured to and extends from the second end of the detector (1) to couple electrically the at least one magnetic field sensor element (4) with a control unit; and
   a hollow shaft (3) being rotatably supported, with respect to the housing, and having a section for generating a magnetic field (2), the detector (1) extending coaxially within the hollow shaft (3) such that the at least one magnetic field sensor element (4) being aligned adjacent to the magnetic field (2) of the hollow shaft (3), and the fixed magnetic field sensor element (4) detecting changes of the magnetic field (2), as the hollow shaft (3) rotates relative to the detector (1), with the changes of the magnetic field (2) being proportional to the torque applied to the hollow shaft (3).

8. An arrangement for a non-contact measurement of torque for a shaft of a transmission via at least one detector (1) for detecting a change in a magnetic field (2) as a function of the torque applied to the shaft,
   wherein shaft is a hollow shaft (3),
   the detector (1) comprises an elongate support that is inserted inside the hollow shaft (3),
   at least one sensor element (4) is arranged adjacent a first end of the support which is inserted into the hollow shaft (3), and
   a second end of the support is a mounting flange (5) for securing the detector to the arrangement.

9. The arrangement according to claim 8, wherein the hollow shaft (3) has a magnetic section which generates the magnetic field (2).

10. The arrangement according to claim 8, wherein the arrangement is used in an all-wheel distributor transmission for regulating torque transfer for a clutch.

11. The arrangement according to claim 1, wherein the hollow shaft (3) has a magnetic section which generates the magnetic field (2).

\* \* \* \* \*